Oct. 10, 1939.  J. W. LEIGHTON  2,175,298

THREADED BEARING

Filed Aug. 17, 1936

INVENTOR
John W. Leighton.
BY
Harness, Dickey, Pierce & Hann.
ATTORNEYS.

Patented Oct. 10, 1939

2,175,298

UNITED STATES PATENT OFFICE 2,175,298

THREADED BEARING

John W. Leighton, Port Huron, Mich.

Application August 17, 1936, Serial No. 96,421

10 Claims. (Cl. 308—2)

The present invention relates to threaded bearings for use in making oscillating pivotal connections.

Threaded bearings have gone into extensive use for pivotally connecting parts which oscillate relative to each other, inasmuch as they constitute an extremely inexpensive combined radial and thrust bearing, and they have been found particularly adapted for use in connection with spring shackles, pivot bolts, and independent wheel suspensions on automobiles. In manufacturing such threaded bearings by mass production methods it has been found impossible to provide very close tolerances due to the fact that the threaded bearing members become slightly distorted during the heat treatment to which they are subjected following the thread forming operation, and also due to minor errors in the lead or pitch diameters of the threaded members. In this connection it may be noted that since the bearing members preferably should have a relatively close fit throughout their entire length, a very minute error in the lead or pitch of the thread will be cumulative, and will result in a substantial variation in the clearance between threads of the respective members. Accordingly, in the past it has been necessary to provide relatively large clearance between the inner and outer bearing members in order that sufficient freedom of oscillation between them would result. This, however, frequently results in undesired longitudinal free play between the two bearing members which causes side jumping and objectionable clacking noises. These are particularly objectionable in connection with spring shackles and independent wheel suspensions of automobiles where the load is relatively light and the parts are subject to a rapid weaving and bouncing action.

Accordingly it is the object of the present invention to provide a threaded bearing of the type mentioned which is free from longitudinal or axial free play and yet which provides sufficient freedom of oscillation to operate satisfactorily; and to provide such a threaded bearing which is no more expensive or difficult to manufacture than the simple threaded bearing.

With the above and other objects in view, which appear in the following description and in the appended claims, two illustrative embodiments of the present invention are shown in the accompanying drawing, in which:

In accordance with the present invention the threaded bearing members are manufactured in substantially the manner previously utilized except that over a relatively small extent of the length of the bearing and preferably at one end of the bearing a relatively tight fit is provided between the inner and outer bearing members. The extent of this tightly fitting area may vary slightly in accordance with the requirements, but preferably does not extend over two or three threads, the remainder of the bearing being sufficiently loose to compensate for distortion of the bearing members caused by heat treatment or minor errors in the lead or pitch diameter in accordance with the previous practice. It will be noted that the provision of a tight fit over a relatively short extent of the bearing is possible in view of the fact that lead errors do not accumulate sufficiently over a short length to cause difficulty and the fact that the effect of distortion is correspondingly less. In the resulting bearing therefore the few relatively tight threads positively prevent axial play between the bearing members without causing binding or jamming of such members together.

Figure 1:
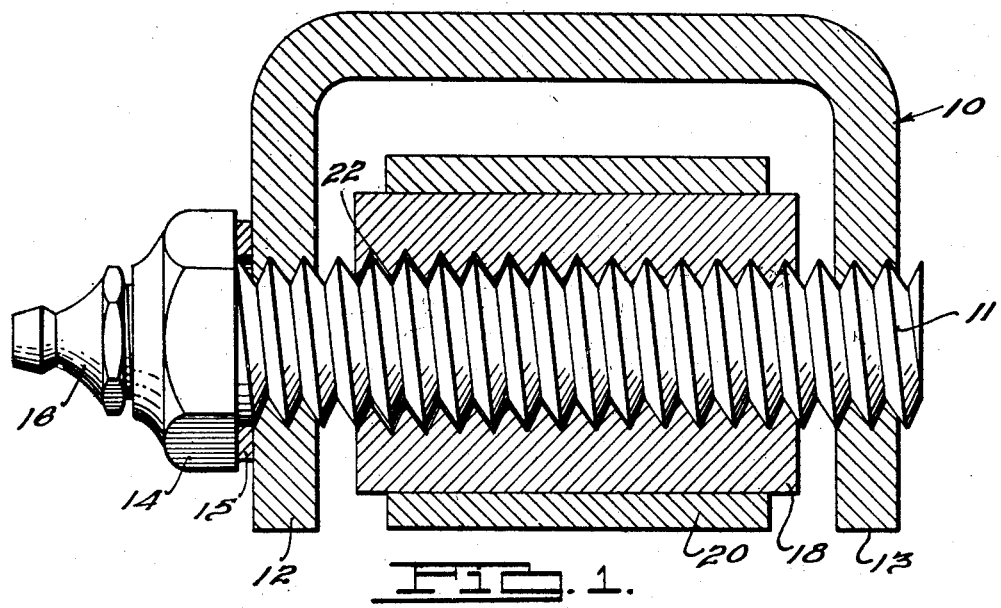
Fig. 1 is a sectional view through the axis of a threaded bearing which for purposes of illustration is shown in connection with a pivotal spring mounting.

In Fig. 1 is shown one method of securing the above described result. As there illustrated, the bearing members are utilized to pivotally connect one end of an automobile spring to the frame of the automobile. For this purpose a bracket member 10 is provided which is connected in any suitable manner to the under side of the frame of the vehicle, and a threaded pivot bolt 11 is threaded in suitable openings in the downwardly extending arms 12 and 13 of the bracket. The pivot bolt 11 is preferably provided with a head 14 which is jammed against a lock washer 15 to lock the pivot bolt against rotation with respect to the bracket 10. It is apparent, however, that any other means for preventing relative rotation between the pivot bolt and the bracket may be utilized. In accordance with conventional practice a lubricant fitting 16 is provided in the head of the bolt and is in communication with suitable passages (not shown) in the bolt for conducting lubricant to the bearing surfaces. Threaded upon the bolt is an outer bearing 18 provided with internal threads which mate with the exterior threads on the bolt 11 to provide a threaded bearing; and the outer bearing member 18 carries in any desired manner the eye 20 which is provided at one end of the conventional automobile leaf spring.

In order to provide a tight fit at one end of the bearing, in this form of the invention the threaded opening in the outer bearing member 18 is formed on a very slight taper and the pitch surface of the external threads on the bolt is cylindrical with the result that the clearance between the outer bearing member and the bolt or inner bearing member is greater at the left hand end of the bearing than it is at the right hand end of the bearing as viewed in the drawing. The greater clearance at the left hand end of the bearing is shown in Fig. 1 of the drawing in an exaggerated manner at 22.

It is important to provide a proper degree of taper or divergence between the inner and outer bearing members and it has been found that highly desirable results are secured by providing a clearance between the pitch surface of the threads on the inner and outer bearing members which varies from 0.002" at the tight end of the bearing to 0.028" at the loose end. Accordingly, the pitch surface of the bolt formed in the invention shown in Fig. 1 is cylindrical, whereas the pitch surface of the threads of the outer bearing member 18 is conical. It may be noted, as shown in Fig. 1, that in assembling the bearing the loose end of the outer bearing member 18 is threaded first upon the bolt thus leaving the tight threads to be the last which are threaded into position.

Figure 2:
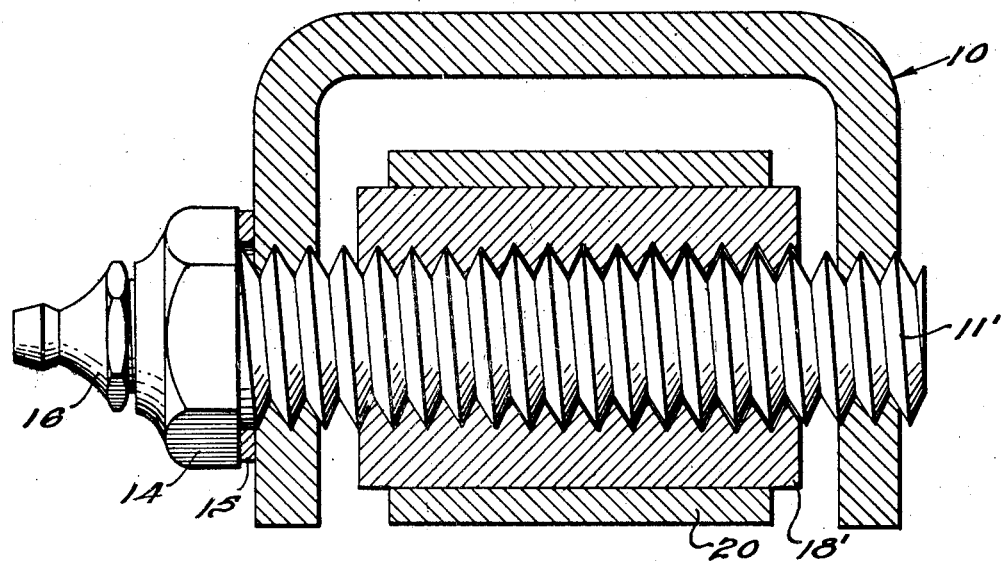
Fig. 2 is a view similar to Fig. 1 showing a modified form of the invention.

In the form of the invention shown in Fig. 2 the same result is achieved by providing internal threads on the outer bearing member 18' which have a cylindrical pitch surface and providing a conical pitch surface for the external threads on the inner bearing member 11'. In this case the amount of clearance between the inner and outer bearing members preferably varies between the limits set forth in connection with Fig. 1, but the small end of the bolt 11' is provided at its right hand or headless end with the result that the greatest clearance between the inner and outer bearing members occurs at that end of the bearing. The structure shown in Fig. 2 is in all other respects similar to that described above in connection with Fig. 1.

Figure 3:
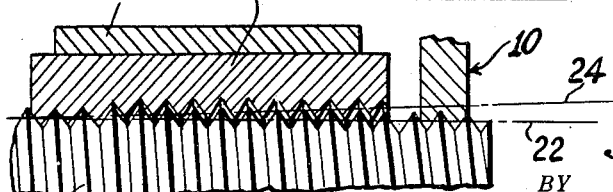
Fig. 3 is a fragmentary view similar to Fig. 1, showing another modified form of the invention.

In addition to the two methods described above for accomplishing the desired result it is apparent that both the inner and outer members 11" and 18", respectively, could be provided with threads formed on a tapered pitch surface, as shown in Fig. 3. When so formed the tapers could approach oppositely directed apexes, as indicated by the pitch surfaces 22 and 24. Pitch surface 22 is the pitch surface for the inner member 11" and the apex of this surface is to the right of Fig. 3. Pitch surface 24 is the pitch surface for the threads of outer member 18" with its apex to the left of Fig. 3. Another manner would be to have the conical surfaces incline in the same direction, but with different angles of conicity. It is only necessary that the clearance between one end of the bearing and the other vary approximately between the limits set forth above in order to secure the desired results.

It is preferable to provide a uniformly increasing divergence between the pitch surface of the inner and outer bore members by one of the methods described above inasmuch as the errors and distortion tend to be cumulative along the length of the bearing members. Accordingly, the divergence between the pitch diameters and therefore the clearance between the threads of the inner and outer members, if progressively increasing, tends to correspond to the amount of clearance required. This permits a closer fit between the inner and outer members throughout the lengths thereof than would be possible if the amount of clearance did not increase at a uniform rate. It is apparent, however, that beneficial results can be achieved by providing in any other way a few threads, at one point along the length of the bearing which make a tight fit, leaving the normal clearance between the threads of the respective bearing threads throughout the remainder of the length of the bearing.

While several embodiments of the invention have been shown and described, it is apparent that others may be utilized within the spirit of the invention as set forth herein and within the scope of the appended claims. And it will be understood that the invention, while illustrated in connection with a spring mounting is fully applicable to any threaded bearing.

What I claim is:

1. A threaded bearing comprising relatively rotatable inner and outer members having interengaging external and internal threaded bearing surfaces respectively, said interengaging threaded bearing surfaces having a relatively snug fit with each other throughout a minor portion of the length of the bearing and a looser fit throughout the remainder thereof.

2. A threaded bearing comprising relatively rotatable inner and outer members having interengaging external and internal threaded bearing surfaces respectively, the pitch diameters of the threaded surfaces of said members having greater clearance at one end of the bearing than at the other, said members being normally oscillatory one with respect to the other.

3. A threaded bearing comprising relatively rotatable inner and outer members having interengaging external and internal threaded bearing surfaces respectively, the ratio of the pitch diameter of the internally threaded member to the pitch diameter of the externally threaded member progressively increasing from one end of the bearing to the other.

4. A threaded bearing comprising relatively rotatable inner and outer members having interengaging external and internal threaded bearings surfaces respectively, the threads on one of said members having a cylindrical pitch surface and the threads on the other having a conical pitch surface whereby there is greater clearance between the threads of the respective members at one end of the bearing than at the other.

5. A threaded bearing comprising relatively rotatable inner and outer members having interengaging external and internal threaded bearing surfaces respectively, the threads on said outer member having a cylindrical pitch surface and the threads on the inner member having a conical pitch surface.

6. A threaded bearing comprising relatively rotatable inner and outer members having interengaging external and internal threaded bearing surfaces respectively, the threads on said outer member having a conical pitch surface and the threads on the inner member having a cylindrical pitch surface.

7. A threaded bearing comprising relatively rotatable inner and outer members having interengaging external and internal threaded bearing surfaces respectively, the threads of said members having coaxial conical pitch surfaces, the apex of the conical pitch surface of one of said members pointing in the opposite direction to the apex of the conical pitch surface on the other member.

8. A threaded bearing comprising relatively rotatable inner and outer members having interengaging external and internal threaded bearing surfaces respectively, the radial clearance between the pitch surfaces of the threads on the respective members progressively and uniformly increasing from one end of the bearing to the other.

9. A threaded bearing comprising relatively rotatable inner and outer members having interengaging external and internal threaded bearing surfaces respectively, the radial clearance between the pitch surface of the threads on the respective members progressively and uniformly increasing from approximately 0.002" at one end of the bearing to 0.028" at the other end thereof.

10. A threaded bearing comprising relatively rotatable inner and outer members having interengaging external and internal threaded bearing surfaces respectively, the ratio of the pitch diameter of the internally threaded member to the pitch diameter of the externally threaded member progressively increasing along the bearing.

JOHN W. LEIGHTON.